May 22, 1956 G. R. FRANTZ 2,747,163

LINEARIZER FOR FREQUENCY MODULATION GENERATOR

Filed June 27, 1950 2 Sheets-Sheet 1

INVENTOR
G. R. FRANTZ
BY
Franklin Mohr
ATTORNEY

May 22, 1956 G. R. FRANTZ 2,747,163

LINEARIZER FOR FREQUENCY MODULATION GENERATOR

Filed June 27, 1950 2 Sheets-Sheet 2

FIG. 3

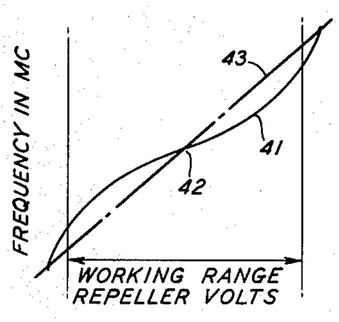

REFLEX OSCILLATOR WORKING INTO A MATCHED LOAD

FIG. 4

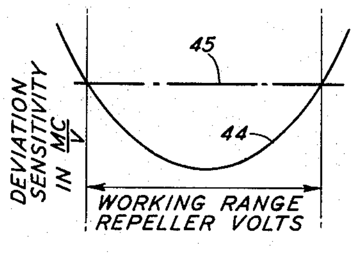

REFLEX OSCILLATOR WORKING INTO A MATCHED LOAD

FIG. 5

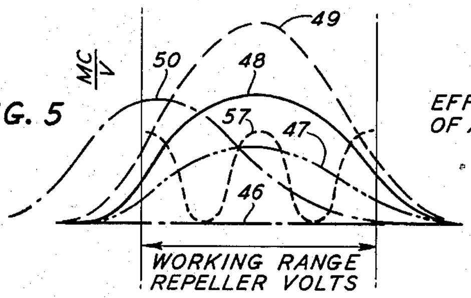

EFFECT UPON DEVIATION SENSITIVITY OF A MISMATCH SEVERAL FEET AWAY

FIG. 6

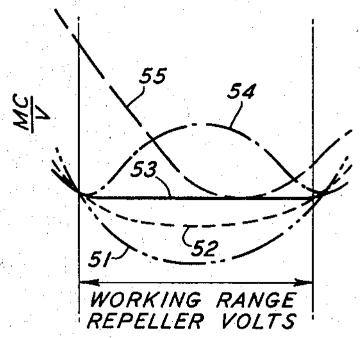

OSCILLATOR WORKING INTO VARIOUS LOADS

FIG. 7

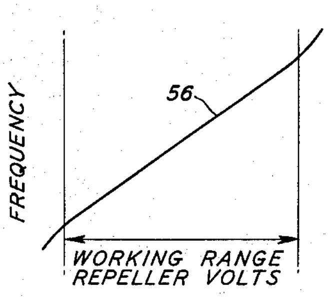

OSCILLATOR WORKING INTO OPTIMUM LOAD

INVENTOR
G. R. FRANTZ
BY Franklin Mohr
ATTORNEY

United States Patent Office 2,747,163

Patented May 22, 1956

2,747,163

LINEARIZER FOR FREQUENCY MODULATION GENERATOR

Glenn R. Frantz, Westfield, N. J., assignor to Bell Telephone Laboratories, Incorporated, New York, N. Y., a corporation of New York Application June 27, 1950, Serial No. 170,648

2 Claims. (Cl. 332—18)

This invention is in the field of frequency modulation generators and is directed to arrangements for improving the degree of linearity in the modulation characteristic, that is, in the relationship between the frequency generated by the system and the value of applied modulating potential determining the frequency generated.

Over a very narrow range of modulating voltages the frequency characteristic of any given oscillator may be substantially linear, but over greater ranges a departure from linearity becomes evident and may be objectionable.

In accordance with the invention, means are provided for compensating the tendency of a given frequency modulating system to depart from linearity over a relatively wide working range of modulating potentials.

In the drawings:

Figs. 3 to 7 inclusive are diagrams useful in explaining the operation of the invention.

Figures 1, 2:
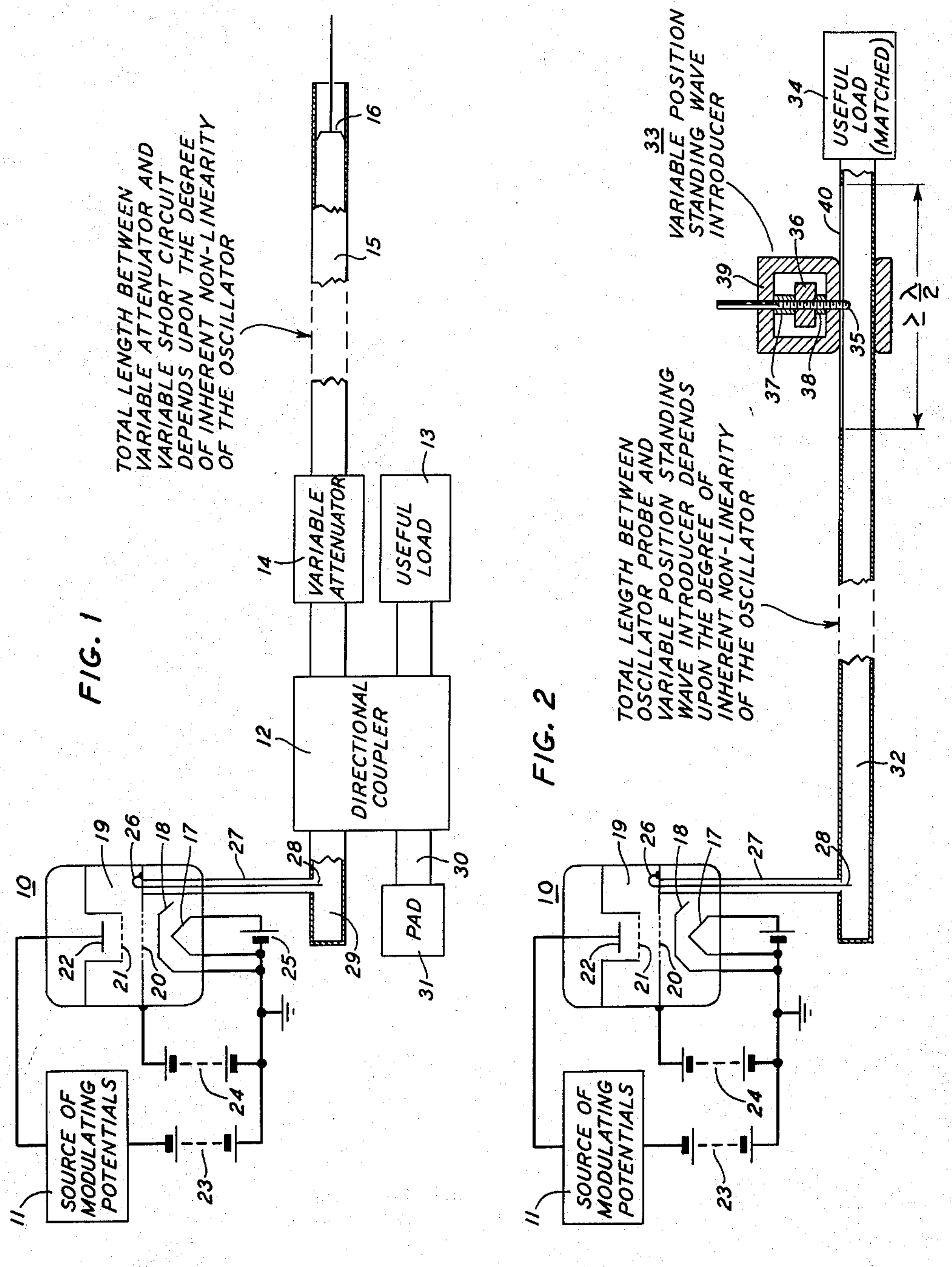
Fig. 1 is a schematic diagram of a frequency modulation system embodying one form of the invention.
Fig. 2 is a schematic diagram of a frequency modulation system embodying another form of the invention.

In Fig. 1 there is shown a reflex oscillator 10, the frequency of which may be varied by means of a source 11 of modulating potentials connected to the repeller electrode of the oscillator. The output of the oscillator is connected through a directional coupler 12 to a useful load 13. Directional couplers of the kind employed herein are disclosed in a copending application of W. W. Mumford, Serial No. 540,252, filed June 14, 1944, now Patent No. 2,562,281, issued July 31, 1951, and assigned to the same assignee as the present application. In one of the four branches of the directional coupler there are provided a variable attenuator 14, a length of wave-guide section 15 which is several wavelengths in extent, and a slidable short-circuiting device or piston 16. The elements 14, 15 and 16 cooperate as described hereinafter to improve the linearity of the modulation characteristic of the oscillator, that is, the relationship between the oscillator frequency and the modulating potential required to produce the given frequency.

The oscillator 10 comprises a heater 17, a cathode 18, a cavity resonator 19 having electron permeable grids 20 and 21, and the repeller electrode 22. The source 11 of modulating potentials is connected between the cathode 18 and the repeller 22 together with a source 23 of biasing potential. An energizing potential source 24 is connected between the cathode 18 and the cavity resonator 19 and a source 25 of heating current is provided for the heater 17. An output coupling loop 26 is provided in the cavity resonator 19 and is connected by a coaxial transmission line 27 to a probe 28 extending into a wave-guide section 29 which is connected at the other end to a branch of the directional coupler 12. The useful load 13 is connected to one remaining branch of the directional coupler. The final branch of the directional coupler is connected through a wave guide 30 to a pad 31.

In the operation of the system of Fig. 1, the oscillator 10 functions in the well-known manner of a reflex oscillator of the electron velocity variation type and is capable of frequency modulation under the application of variable modulating potentials to the repeller 22 from the source 11. The frequency modulated output from the oscillator is supplied to the useful load 13 through the output coupling loop 26, coaxial line 27, probe 28, wave guide 29 and directional coupler 12. The directional coupler has the property that a wave applied to any branch is transmitted to two other branches. Provided these latter two branches are balanced or have a certain predetermined ratio of impedances, there will be substantially no transmission into the fourth branch. The first and fourth branches in this case are designated as conjugate to each other. Specifically, in the directional coupler 12 it is arranged that a wave applied to the coupler 12 from the wave-guide section 29 is transmitted mainly to the variable attenuator 14 and following elements 15, 16, with a small amount of transmission to the load 13 and substantially nothing to pad 31 which is conjugate to the oscillator 10. A reflected wave from the variable attenuator 14 is transmitted mainly to the wave-guide section 29 and oscillator 10, with a small amount of transmission to the pad 31 and substantially nothing to the load 13, the circuit 14, 15, 16 being conjugate to the load 13. Effectively, the directional coupler couples the oscillator 10 loosely to the load 13, leaving the circuit 14, 15, 16 dominant in controlling the operation of the oscillator. The load 13 has relatively little reaction upon the oscillator 10 and furthermore, the load is protected from receiving any substantial reflected wave from the circuit 14, 15, 16.

In accordance with the invention, the modulation characteristic of the oscillator 10 may be made highly linear by adjustment of the setting of the variable attenuator 14, the length of the line section 15 and the position of the piston or variable short-circuiting element 16.

The invention may be used in any frequency modulation system in which the frequency of the oscillator is swept over a frequency range and in which the oscillator is of a type meeting both of the following requirements:

(1) The frequency of oscillation is a function of the impedance into which the oscillator works.

(2) The frequency modulation characteristic of the oscillator is either steeper on both sides of the center frequency in the operating range, or less steep on both sides.

The combination of the variable attenuator 14 and the variable short-circuiting element 16 presents to the output of the oscillator 10 an impedance which in general is a mismatch and which may be adjusted in amplitude by means of the attenuator and in phase by the position of the short circuit. A total variation in position of the short circuit amounting to a half wavelength will permit the adjustment of the phase of the mismatch over all possible values.

The number of whole wavelengths between the oscillator and the short circuit is a factor which must be taken into account but this number is found to be not very critical in its effect upon the linearity of the modulation characteristic. For reflex oscillators operating in the 4,000-megacycle range, any length of guide 15 between 4 and 8 feet has been found to be suitable. In this range, also, it has been found that less attenuation is required in the attenuator 14 for the shorter lengths of wave guide 15.

It has been found also that a part or all of the lengths of wave guide shown in Fig. 1 may be replaced by coaxial transmission lines. Combinations of wave guide and coaxial cable have been found advantageous in facilitating the mounting of the equipment.

The optimum adjustment of linearity in the modulation characteristic may be obtained by manipulation of the variable attenuator 14 and the piston 16, particularly when guided by a linearity gauge such as is described in my copending application, Serial No. 170,647 now Patent No. 2,678,383, filed June 27, 1950, issued May 11, 1954.

Fig. 2 shows an alternative system in accordance with the invention, where it is desired to deliver to the useful load substantially the full power output of the oscillator. To so utilize the power puts a more severe impedance requirement upon the load than in the case of the system of Fig. 1.

In Fig. 2, the oscillator 10 is connected directly into a wave guide 32 without any directional coupler or like device. A variable position standing wave introducer 33 is provided in the wave guide at a distance of several wavelengths from the oscillator and between the oscillator and a useful matched impedance load 34.

The device 33 provides a probe 35 which is adjustable both as to the distance to which it extends into the wave guide 32 and as to its position longitudinally of the wave guide 32. The probe may be threaded externally to mesh with internal threads in a captive nut 36 held between bushings 37 and 38 in a yoke 39. The yoke 39 may be slidably mounted with the probe projecting into the wave guide through a longitudinal slot 40 of length equal to or greater than a half wavelength.

In the operation of the system of Fig. 2, the probe 35 is adjusted in degree of penetration and in position longitudinally of the wave guide, preferably with the aid of a linearity tester, until optimum linearity of the modulation characteristic is obtained. The device 33 introduces an adjustable impedance mismatch between the oscillator and the load to improve the linearity of the modulation characteristic.

Figs. 3 to 7 inclusive may be referred to in explaining the theory of operation of the invention.

Fig. 3 shows the inherent modulation characteristic representative of a reflex oscillator working into a matched impedance load. The abscissa is the voltage upon the repeller and the vertical parallel lines delimit the normal working range of the oscillator as a frequency modulator. The ordinate is the frequency, which may be in megacycles.

The characteristic 41 is a curve having a point of inflection 42 about which the curve is approximately symmetrical, the frequency being approximately an odd function of the repeller voltage. A theoretical linear characteristic 43 is shown in broken line for comparison.

Fig. 4 shows the deviation sensitivity of the curves of Fig. 3. The sensitivity curve 44 represents the relative slope of the curve 41 as a function of the repeller voltage, in units of megacycles per volt. The curve 44 is evidently a second degree curve such as a parabola and has a minimum value near the center of the range. For comparison the horizontal broken line 45 indicates the deviation sensitivity of the theoretical linear characteristic 43.

Fig. 5 shows the effect upon the deviation sensitivity of impedance mismatches several wavelengths away from the oscillator. The effects are shown in terms of change in the value of megacycles per volt and are qualitative and believed to be representative of the actual effects obtained. Curve 46 gives the effect of no mismatch and is for comparison only. Curve 47 represents a small amount of mismatch not enough to compensate for the curvature of the characteristic 44 of Fig. 4. Curve 48 represents the optimum value of mismatch which compensates to greatest degree the curvature of the curve 44. Curve 49 represents a mismatch too large to effect maximum compensation. Curve 50 represents a mismatch of amplitude equal to that of curve 48 but with a different phase adjustment preventing anything like optimum compensation, since the maximum correction does not occur in the center of the working range.

Fig. 6 shows the effect of combining in turn the corrections of curves 46 to 50 inclusive with the uncompensated sensitivity curve 44 of Fig. 4. Curve 51 combines curves 44 and 46 resulting in a curve unmodified from curve 44. Curve 52 combines curves 44 and 47 and shows under-correction as to amplitude, with phase adjustment correct. Curve 53 shows optimum compensation obtained by combining curves 44 and 48. Curve 54 shows over-correction in amplitude, with phase adjustment correct, and curve 55 shows correct amplitude adjustment combined with incorrect phase adjustment.

Fig. 7 shows the modulation characteristic 56 obtained by working the oscillator into the optimum impedance mismatch, giving a substantially linear relationship between frequency and repeller voltage.

The arrangement of Fig. 1 may be modified, if desired, by substituting the standing wave introducer 33 to perform the functions of the variable attenuator 14 and the piston 16, the device 33 being placed in the wave-guide section 15 at about the position theretofore occupied by the piston 16, and by terminating the wave-guide section 15 in a matched load at a point beyond the standing wave introducer.

The total length of transmission line riquired between the oscillator 10 and the piston 16 or between the oscillator and the standing wave introducer 33 depends upon the degree of inherent non-linearity of the oscillator. This point may be explained in terms of Figs. 3 to 7 inclusive, by noting that the greater the curvature of the curve 44 of Fig. 4, the greater the curvature required in the compensating curve of Fig. 5.

In general, curvature is approximately proportional to length of line and magnitude of mismatch. Thus curve 48 could be approximated using a line several wavelengths longer with a smaller mismatch or a line several wavelengths shorter with a larger mismatch. If the line is too short a very large mismatch will be required which may reduce the output power of the oscillator and tend to make its output unstable. If the line is extremely long a curve such as 57 would result which evidently does not have the required shape. Thus, the line should be sufficiently long to produce the required shape with a moderate mismatch, and not so long that it tends to produce inflection points in the curve within the working range.

The longitudinal position of the piston 16 or standing wave introducer 33 has essentially no effect upon the shape of the compensating curve but it determines the point of maximum compensation. This is quite critical as can be seen by comparison of curves 53 and 55 which correspond to piston positions differing by about one-eighth wavelength.

Further modifications beyond those illustrated herein but within the spirit and scope of the invention will be evident to those skilled in the art.

What is claimed is:

1. In a frequency modulation system, a reflex oscillator having a repeller electrode whereby the frequency of the oscillator may be modulated over a given extended frequency range by variation of the repeller voltage, said oscillator having a frequency versus repeller voltage characteristic with operating conditions of matched impedance which departs from linearity over said bandwidth in accordance with a predetermined deviation characteristic, a source of modulating potentials connected to said repeller electrode, a directional coupler, a load circuit loosely coupled to the oscillator through the coupled path of the directional coupler, a transmission line several wavelengths long within said frequency range closely coupled to the oscillator through the direct transmission path of the directional coupler, means including a short circuiting termination at the end of said transmission line for reflecting energy to said oscillator and for reacting on said oscillator in opposition to said deviation characteristic throughout said frequency range, and attenuator means in said transmission line for establishing the magnitude of the energy reflected from said termination to said oscillator to substantially eliminate said deviations from linearity, 2. In a frequency modulation system, a reflex oscillator having a repeller electrode whereby the frequency of the oscillator may be modulated over a given extended frequency range by variation of the repeller voltage, said oscillator having a frequency versus repeller voltage characteristic with operating conditions of matched impedance which departs from linearity over said bandwith in accordance with a predetermined deviation characteristic, a source of modulating potentials connected to said repeller electrode, a directional coupler, a load circuit loosely coupled to the oscillator through the coupled path of the directional coupler, a transmission line several wavelengths long within said frequency range closely coupled to the oscillator through the direct transmission path of the directional coupler, means including an adjustable short circuiting termination at the end of said transmission line for reflecting energy to said oscillator and for reacting on said oscillator in opposition to said deviation characteristic throughout said frequency range, and variable attenuator means in said transmission line for establishing the magnitude of the energy reflected from said termination to said oscillator to substantially eliminate said deviations from linearity.

References Cited in the file of this patent

UNITED STATES PATENTS

| | | |
|---|---|---|
| 2,160,466 | Usselmann | May 30, 1939 |
| 2,421,725 | Stewart | June 3, 1947 |
| 2,425,657 | Tunick | Aug. 12, 1947 |
| 2,434,704 | Kroger | Jan. 20, 1948 |
| 2,510,842 | Strutt et al. | June 6, 1950 |
| 2,529,736 | Moulton | Nov. 14, 1950 |
| 2,549,385 | Rapuano | Apr. 17, 1951 |
| 2,625,460 | Cloud et al. | Jan. 13, 1953 |
| 2,636,116 | Taylor | Apr. 21, 1953 |